United States Patent
Perks

[11] 3,727,973
[45] Apr. 17, 1973

[54] HINGED DRAUGHT DEFLECTORS FOR VEHICLE OPENING ROOFS

[75] Inventor: Joseph Perks, Birmingham, England

[73] Assignee: Weathershields Limited, Birmingham, England

[22] Filed: June 28, 1971

[21] Appl. No.: 157,504

[52] U.S. Cl. ..................296/137 E, 296/91
[51] Int. Cl. ..................B60j 7/22
[58] Field of Search ..............296/137 E, 137 F, 296/137 H, 97 K, 97 H, 91, 152; 98/2.12, 2.14; 160/354; 49/383

[56] References Cited

UNITED STATES PATENTS 3,156,175  11/1964  Werner ..................98/2.14
3,368,841  2/1968  Grau ..................296/91

Primary Examiner—Benjamin Hersh
Assistant Examiner—D. M. Mitchell
Attorney—Scrivener, Parker, Scrivener & Clarke

[57] ABSTRACT

A hinged deflector for a vehicle opening roof comprises a transverse flap adapted to be hingedly connected to the front end of the roof opening. A transverse sealing strip for attachment to the roof at the front end of the opening is provided with a rearwardly disposed part-circular bead having an outer curved surface with which the edge of the flap adjacent to the strip is adapted to make full facial abutment, at least when the flap is in either an operative upwardly and rearwardly inclined position or an inoperative downwardly and forwardly inoperative position.

10 Claims, 5 Drawing Figures

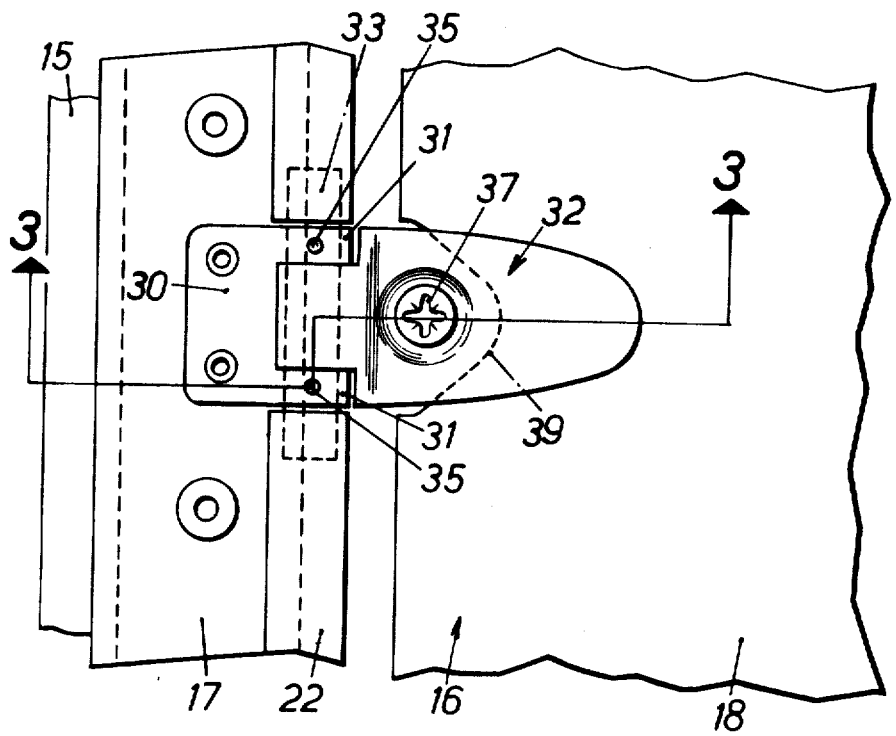
Fig-2-
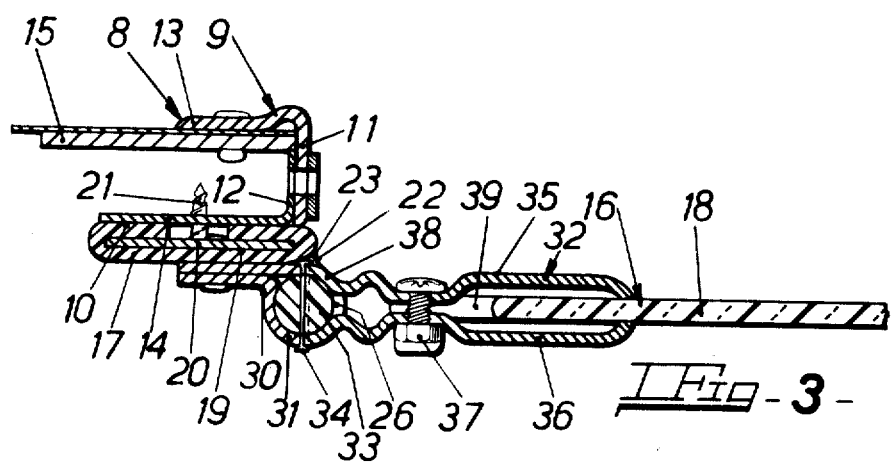
Fig-3-

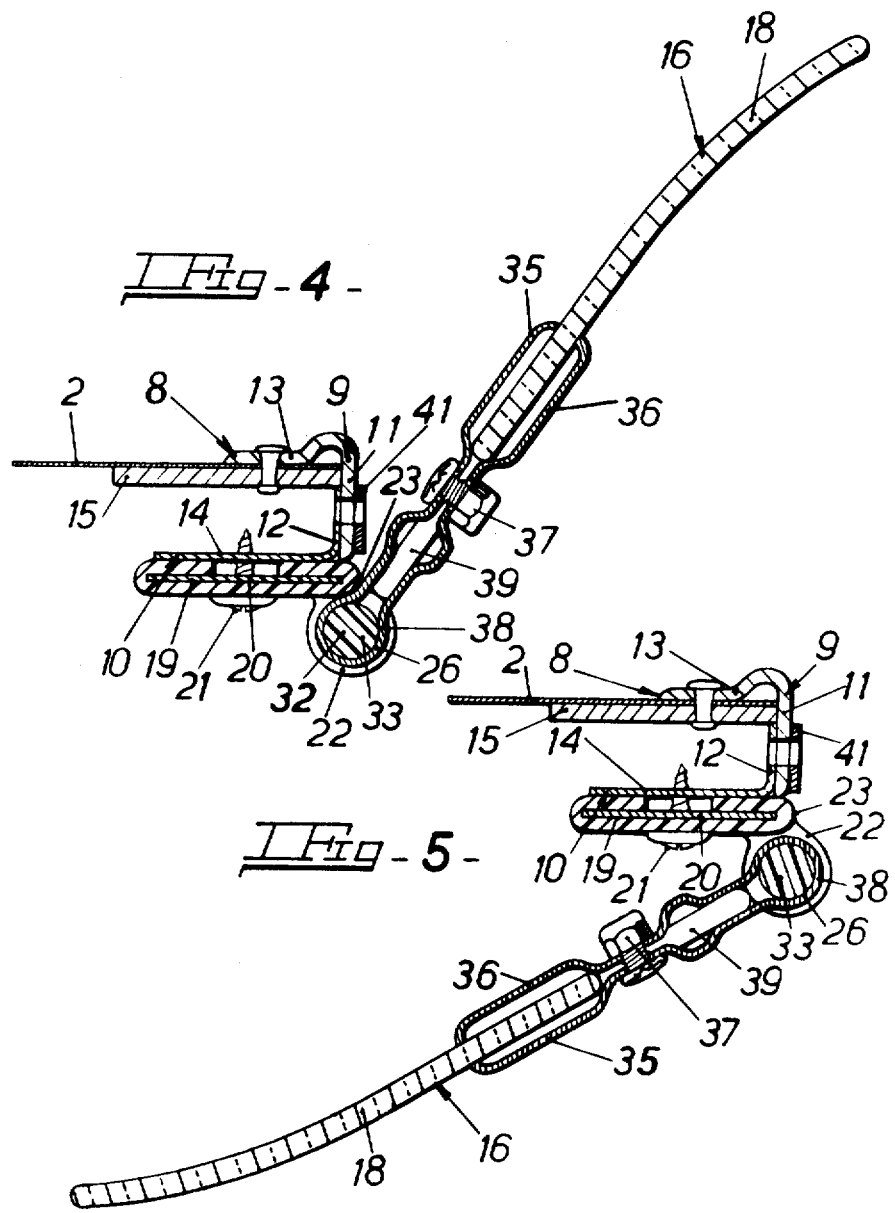

HINGED DRAUGHT DEFLECTORS FOR VEHICLE OPENING ROOFS

SPECIFIC DESCRIPTION

This invention relates to improvements in hinged deflectors for vehicle opening roofs of the kind comprising a transverse flap for location at the front end of an opening in the front part of a vehicle roof which is adapted to be closed by a panel assembly slidable in guides extending along each side of the opening and, when the panel assembly is moved rearwardly to uncover at least a part of the opening, the flap can be hinged manually about a transverse axis at the front end of the opening between a downwardly and forwardly extending inoperative position and at least one upwardly and rearwardly inclined operative position.

Hitherto, in hinged draught deflectors of the kind set forth the flap is connected to a member at the front end of the opening by a pair of transversely spaced hinges and the edge of the flange of the hinges and the edge of the flap adjacent to the front end of the opening are exposed to the interior of the vehilce when the flap is in the inoperative or operative position.

Also hinged deflectors of the kind set forth incorporate locking means which are engageable to hold the flap in any one of a plurality of angularly spaced operative positions and which are releasable, by an occupant of a vehicle, to permit the deflector, thereafter, to be hinged towards the inoperative position. Such locking means do not always operate satisfactorily with the result that it may be impossible for the flap to be retained in an operative position. Furthermore, difficulty is sometimes experienced in releasing the locking means to permit the flap to be returned to the inoperative position so that the panel assembly can be moved longitudinally to close the opening.

When the flap is in the operative position a gap betwen the roof at the front end of the opening and the adjacent edge of the flap allows small draughts to enter the passenger compartment when the vehicle is in motion.

Due to recent legislation in the United States of America it is now a requirement that sharp edges and other projections which are likely to injure an occupant of a vehicle, if the vehicle is involved in an accident or is subjected to severe braking, are removed from or otherwise hidden within the interior of a vehicle.

According to our invention in a hinged draught deflector of the kind set forth a transverse sealing strip for attachment to the roof at the frot end of the opening is provided with a rearwardly diposed part-circular bead having an outer curved surface with which the edge of the flap adjacent to the strip is adapted to make a full facial abutment at least when the flap is in its operative and inoperative positions.

Thus, when in either the operative or inoperative position, the edge of the flap adjacent to the roof at the front end of the opening can at no time be exposed to an occupant of the vehicle.

The provision of the sealing strip provides an effective seal between the flap and the roof at the front end of the opening, and there is no gap between the flap and the roof through which small draught can enter the vehicle when the flap is in the operative position.

The flap is hingedly connected to the sealing strip at the front end of the opening by a pair of transversely spaced hinges of which the corners of the flanges are rounded so that there is no danger of the hinges causing injury to a part of the body of an occupant of the vehicle which may contact them.

The flap is also hingedly connected to the roof at the front end of the opening by means of a third hinge assembly located at substantially the mid-point between opposite ends of the flap. The hinge pin of the third hinge assembly is fast in one of the flanges and opposite ends of the pin which project from the hinge assembly are received within the bead of the sealing strip to enhance the engagement of the sealing strip with the roof at the front end of the opening.

The other flange of the third hinge assembly is formed from two superimposed leaves which at their inner ends are shaped to embrace a major portion of the peripheral edge of the hinge pin and provide a friction grip resisting angular movement of the flap about the transverse axis. The frictional grip is chosen so that it is sufficient to hold the flap in the operative position which can be adjusted within a range of substantially 20° inwardly from a fully advanced operative position by moving the flap angularly about the transverse axis. The frictional grip can be increased or decreased by adjusting the effective length of an assembly connecting together the leaves at intermediate points in their lengths.

One embodiment of our invention is illustrated in the accompanying drawings in which:

FIG. 2 is an inverted plan view on an enlarged scale of a central portion of the deflector;

FIG. 3 is a section on the line 3—3 of FIG. 2;

FIG. 4 is a section on the line 4—4 of FIG. 1 showing the deflector in an operative position; and FIG. 5 is a section similar to FIG. 4 but showing the deflector in an inoperative position.

Figure 1:
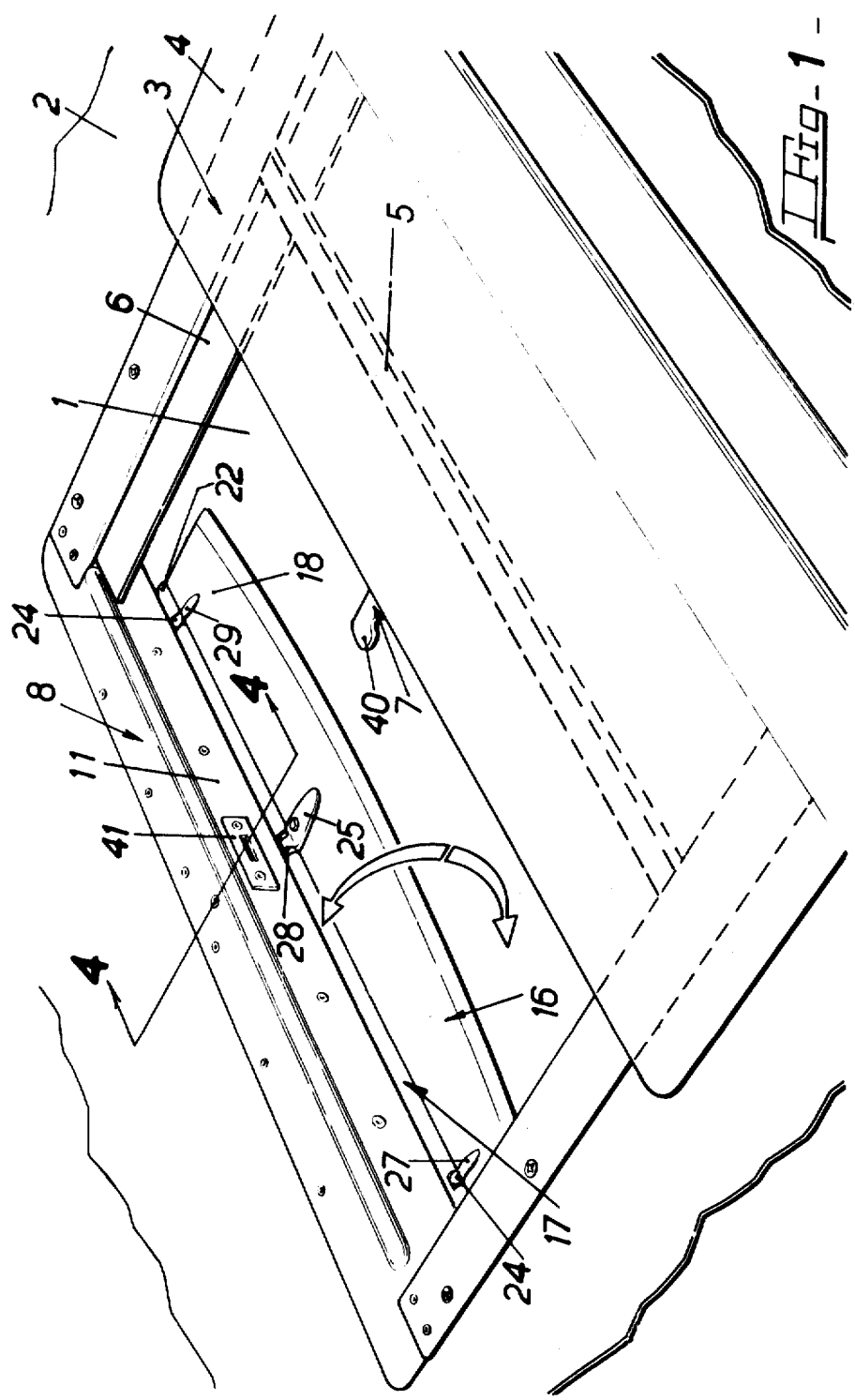
FIG. 1 is a top perspective view of a portion of a roof of a vehicle incorporating an opening adapted to be closed by a panel assembly, a hinged deflector being located at the front end of the opening.

In the construction illustrated in the drawings an opening 1 in the front end of a roof 2 of a vehicle is adapted to be closed by a panel assembly 3. The panel assembly 3 comprises a flexible fabric or like covering supported by cross-members 5 adapted to slide in guide channels 6 in the roof along each side of the opening 1. The covering 4 is secured to the roof at the rear of the opening 1. The front sliding cross-member incorporates handle-operated locking means 7 for engagement with a cross-member assembly 8 secured at opposite ends to the guide channels 6 at their front ends to draw the front sliding cross-member forwardly to tighten the fabric covering and draw it down into close contact with the surface of the roof around the opening 1. The cross member assembly 8 comprises a pair of substantially L-shaped members 9 and 10 of which end flanges 11 and 12 are overlapped and are secured together to hold side flanges 13 and 14 in a spaced parallel relationship. The skin of the roof 2 at the front end of the opening 1 is clamped between the flange 13 and a transverse reinforcing strip 15.

In accordance with our invention a transverse hinged deflector 16 is provided at the front end of the opening 1. As illustrated in the drawings the deflector 16 comprises a transverse sealing strip 17 of resilient synthetic plastics material. The sealing strip 17 extends between opposite ends of the cross-member assembly 8 which is hingedly connected to a transverse flap 18 and the sealing strip 17 is formed throughout its length with a slot 19 of generally Tee outline in the base of which is received a metal reinforcing strip 20. The sealing strip 17 is secured to the flange 14 by means of screws 2 which are passed through openings in the reinforcing strip 20 and are screwed into complementary openings in the flange 14. The lowermost rear edge of the sealing strip 17 leads into an integral downwardly extending bead 22 which projects slightly to the rear of the flange 11 of the uppermost member 9. A shoulder 23 is formed at the point where the bead 22 joins the rear face of the strip 17.

The flap 18 is formed from a convenient rigid or semi-rigid sheet of plastics material of curved outline and is connected to the reinforcing strip 20, which is embedded within the sealing strip 17, by means of a pair of spaced hinge assemblies 24, and a third hinge assembly 25 spaced between the hinge assemblies 24 and located at substantially the mid-point in the length of the flap 18.

The bead 22 is provided with a central bore 26 which extends between opposite ends of the sealing strip 17 for the whole of its length and three local sections of the bead 22 are removed at 27, 28 and 29 to accommodate the three hinge assemblies.

The third hinge assembly 25 comprises a bifurcated flange 30 which is secured to the reinforcing plate 20 of the sealing strip 17 and which is provided with a pair of spaced downwardly extending lugs 31, and a flange 32 of generally U-shaped section hingedly connected to the flange 30 by a hinge pin 33 passed through the lugs 31. The hinge pin 33, which is suitably of nylon or other convenient synthetic plastics material, is made fast in the lugs 31 by the provision of screws or pins 34 and opposite ends of the hinge pin 33, which project from the lugs 31, are received in the open ends of the bore 26 in the bead 22 to enhance the attachment of the sealing strip 17 to the hinge assembly 25.

The other flange 32 of the third hinge assembly 25 is constructed from a metal pressing defining opposed leaves 35 and 36 between which the flap 18 is clamped and the leaves 35 and 36 are urged towards each other by a clamping assembly 17, suitable a nut and bolt, which is passed through aligned openings in the leaves 35 and 36 which are aligned with an opening 19 in the flap 18. The inner ends of the leaves 35 and 36 lead into a curved portion 38 which embraces a substantial portion of the peripheral surface of the pin 32 between the lugs 31 to form a friction grip when the clamping assembly 37 is tightened. The friction grip 37 is sufficient to hold the flap in a fully open upwardly and rearwardly inclined operative position as shown in FIG. 4 defined by the engagement of the flap 18 with a stop comprising the shoulder 23. This increases the seal between the edge of the flap 18 adjacent to the cross-member assembly 8 and the curved surface of the bead 22. Furthermore, the friction grip is sufficient to hold the flap in any convenient angular position spaced inwardly from that fully open operative position by a small angular distance not exceeding for example 20°. The flap 18 can be adjusted manually through this range of operative positions by angular distances which will vary in accordance with the wind speed and the speed of the vehicle. Throughout the range of operative positions the forward edge of the flap 18 is in engagement with the bead 22 on the sealing strip 17.

The leaves 35 and 36 of the pressing are of domed outline and the free end of the flange of each dome is in full facial abutment with an adjacent face of the flap 18. Since the covers of the leaves are rounded and the ends of the flanges are hidden there is no danger of the leaves causing injury to an occupant of the vehicle in which the deflector is installed.

Due to the curvature of the roof of the vehicle at the front of the opening 1 both of the members 9 and 10 of the cross-member assembly 8 are also curved correspondingly and the flap 18 is formed of a similar curvature to provide a substantially continuous surface with the roof at the front of the opening when the deflector 16 is in its operative position. Thus, as the flap 18 is moved in a range between its fully open operative position shown in FIG. 4 and an inoperative position shown in FIG. 5 in which the flap 18 extends downwardly and forwardly and vice versa, the forward edge of the flap 18 will move away from the cross-member assembly 8 as shown in FIG. 2 of the drawings. To permit this to occur the opening 39 in the flap through which the clamping assembly 37 extends is elongated in a longitudinal direction normal to the axis of rotation of the flap. Conveniently, as illustrated, the opening 39 comprises a slot of generally "Vee"outline terminating at the forward edge of the flap 18.

The end flanges 11 and 12 of the cross-member assembly 8 are provided with aligned openings through which a catch 40 carried by the locking mechanism of the opening roof is adapted to pass for releasable co-operation with a keeper or catch plate 41 carried by the end flange 11.

I claim:

1. A hinged deflector for a vehicle opening roof of the type comprising a vehicle roof having a front part in which is located an opening, guides on opposite sides of said opening, and a panel assembly slidable in said guides between a first position in which said opening is closed and a second position in which at least a portion of the opening at its front end is exposed, said hinged deflector comprising a transverse flap for location at a front end of an opening in a vehicle roof and manually hingable about a transverse axis between a downwardly and forwardly extending inoperative position and at least one upwardly and rearwardly inclined operative position, said transverse flap having a forward edge, the invention comprising a transverse sealing strip for attachment to a roof at a front end of an opening, a rearwardly disposed part-circular bead on said strip having an outer curved surface with which said forward edge of said flap is adapted to engage at least when said flap is in both said operative and inoperative positions, and hinge means located substantially between opposite ends of said flap for connecting said flap to said sealing strip, said hinge means comprising a first flange connected to said sealing strip, a second flange connected to said flap and a hinge pin hingably coupling said first and second flanges, said hinge pin being fast in one of said flanges and having opposite ends which project outwardly from said hinge assembly in opposite directions and which are received within said bead.

2. The invention as claimed in Claim 1, wherein said bead extends rearwardly and downwardly from said sealing strip.

3. The invention as claimed in claim 1, wherein said flap is also connected to said sealing strip by a pair of transversely spaced hinges located on opposite sides of said hinge means.

4. The invention as claimed in claim 1, wherein said hinge pin is fast in spaced lugs in said first flange and outer ends of the hinge pin project in opposite directions from said lugs.

5. The invention as claimed in claim 1, wherein said second flange comprises two continuous superimposed leaves having inner ends shaped to embrace a major portion of the peripheral edge of said hinge pin to provide a frictional grip resisting angular movement of said flap about said transverse axis.

6. The invention as claimed in claim 5, wherein an assembly passed through aligned openings in said leaves and in said flap clamps together said leaves and said flap, and means are incorporated for adjusting the effective length of said clamping assembly to vary said frictional grip.

7. The invention as claimed in claim 8, wherein said clamping assembly extends through an opening in said flap and said last mentioned opening is elongated in a direction normal to said axis of rotation of said flap.

8. In combination: a vehicle opening roof and a hinged deflector, said combination comprising a transverse flap located at the front end of an opening in a front part of a vehicle roof and having a forward edge, guides extending along each side of said opening, a panel assembly slidable in said guides between a first position in which the opening is closed and a second position in which at least a portion of said opening at its front end is exposed and, when said panel assemby is moved rearwardly to uncover at least a part of said opening, said flap can be hinged manually between a transverse axis at said front end of said opening between a downwardly and forwardly extending inoperative position and at least one upwardly and rearwardly inclined operative position, the invention comprising a transverse sealing strip attached to said roof at said front end of said opening, hinge means coupling said flap to said sealing strip, and a rearwardly disposed part-circular bead on said strip having an outer curved surface with which said forward end of said flap is adapted to engage at least when said flap is in both said operative and inoperative positions.

9. The invention as claimed in claim 8, wherein said hinge means comprises a pair of transversely spaced hinges and a third hinge assembly located between said hinge of said pair substantially between opposite ends of said flap at substantially the mid-point in the length of said flap, said third hinge assembly comprising a first flange connected to said sealing strip, a second flange connected to said flap, and a hinge pin hingedly coupling said first and second flanges and fast in one of said flanges, opposite ends of said hinge pin projecting mutually from said hinge assembly in opposite directions and received in said bead.

10. The invention as claimed in claim 9, wherein said first flange includes spaced lugs from which said opposite ends of said hinge pin project into said bead, and means are incorporated for making said hinge pin fast in said lugs.

* * * * *